US008849186B2

(12) United States Patent
Gore et al.

(10) Patent No.: US 8,849,186 B2
(45) Date of Patent: Sep. 30, 2014

(54) REPEATER COMMUNICATION USING INSERTED LOW POWER SEQUENCES

(75) Inventors: Dhananjay Ashok Gore, San Diego, CA (US); Sanjiv Nanda, Ramona, CA (US); James Arthur Proctor, Jr., Melbourne Beach, FL (US); Richard Finch Dean, Lyons, CO (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 12/776,728

(22) Filed: May 10, 2010

(65) Prior Publication Data

US 2010/0291865 A1    Nov. 18, 2010

Related U.S. Application Data

(60) Provisional application No. 61/177,451, filed on May 12, 2009.

(51) Int. Cl.
| | |
|---|---|
| *H04B 3/36* | (2006.01) |
| *H04B 7/155* | (2006.01) |
| *H04W 84/04* | (2009.01) |
| *H04W 52/36* | (2009.01) |
| *H04B 1/52* | (2006.01) |
| *H04B 7/26* | (2006.01) |

(52) U.S. Cl.
CPC ......... *H04B 7/15571* (2013.01); *H04W 84/047* (2013.01); *H04W 52/365* (2013.01); *H04B 1/525* (2013.01); *H04B 7/15535* (2013.01); *H04B 7/2606* (2013.01)
USPC ............... 455/7; 455/11.1; 455/13.4; 455/15; 455/16; 455/23; 375/211; 375/213; 370/315; 370/318; 370/310

(58) Field of Classification Search
CPC ... H04B 7/15571; H04B 1/525; H04B 7/2606
USPC .............. 455/7, 11.1, 13.4, 15, 16, 23, 24, 455/41.1–41.3, 422.1, 550.1, 67.11, 445; 375/211, 213; 370/315, 318, 310
See application file for complete search history.

(56) References Cited

U.S. PATENT DOCUMENTS

| | | |
|---|---|---|
| 5,115,514 A | 5/1992 | Leslie |
| 2006/0014491 A1* | 1/2006 | Cleveland ........................ 455/17 |

(Continued)

FOREIGN PATENT DOCUMENTS

| | | |
|---|---|---|
| CN | 1981315 A | 6/2007 |
| GB | 2449278 A | 11/2008 |

(Continued)

OTHER PUBLICATIONS

Partial International Search Report—PCT/US2010/034417—International Search Authority, European Patent Office,Jun. 8, 2010.

(Continued)

*Primary Examiner* — Keith Ferguson
(74) *Attorney, Agent, or Firm* — Thien T. Nguyen (57) ABSTRACT

A method for providing repeater communication in a wireless repeater deployed in a multi-repeater environment includes inserting a message signal into the transmit signal of the repeater. The message signal may be a unique or quasi-unique low power spreading sequence uniquely identifying the repeater from other repeaters in the environment. The message signal may also contain information relating to the operational characteristics of the repeater. The message signal may be detected by another repeater or by an end-user wireless communication device.

39 Claims, 8 Drawing Sheets

(56) References Cited

U.S. PATENT DOCUMENTS

| | | |
|---|---|---|
| 2007/0155314 A1 | 7/2007 | Mohebbi |
| 2009/0053994 A1 | 2/2009 | Senarath et al. |

FOREIGN PATENT DOCUMENTS

| | | |
|---|---|---|
| JP | 2001186073 A | 7/2001 |
| KR | 20030022633 A | 3/2003 |
| KR | 20030066062 A | 8/2003 |
| WO | WO-0182499 A2 | 11/2001 |
| WO | WO-02087275 A2 | 10/2002 |
| WO | WO-2007098313 A2 | 8/2007 |
| WO | WO 2009020326 A1 * | 2/2009 |

OTHER PUBLICATIONS

Taiwan Search Report—TW099115172—TIPO—Apr. 19, 2013.

International Search Report and Written Opinion—PCT/US2010/034417, International Search Authority—European Patent Office, Oct. 2, 2011.

Teyeb O., et al., "Dynamic Relaying in 3GPP LTE-Advanced Networks" Eurasip Journal on Wireless Communications and Networking, Hindawi Publishing Corporation, New York, NY, US, Jan. 1, 2009, pp. 1-11, XP002572643.

* cited by examiner

REPEATER COMMUNICATION USING INSERTED LOW POWER SEQUENCES

CROSS-REFERENCE TO RELATED APPLICATIONS

This application claims the benefit of U.S. Provisional Patent Application Ser. No. 61/177,451, filed on May 12, 2009, which application is incorporated herein by reference in its entirety.

BACKGROUND

1. Field

This disclosure generally relates to repeaters in wireless communication systems.

2. Background

Wireless communication systems and techniques have become an important part of the way we communicate. However, providing coverage can be a significant challenge to wireless service providers. One way to extend coverage is to deploy repeaters.

Figure 1:
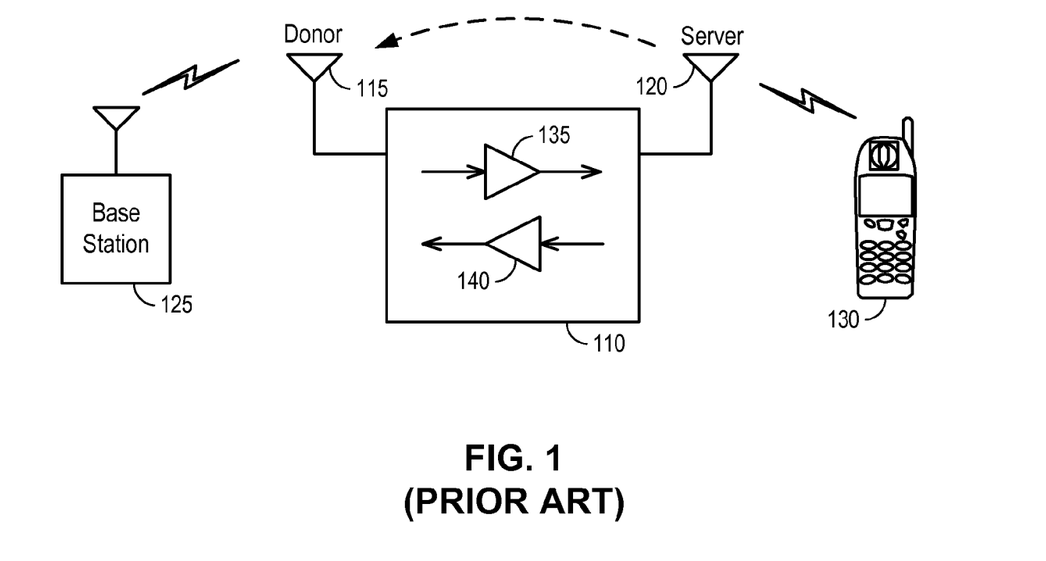
FIG. 1 is a simplified diagram of a repeater according to the prior art.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. According to one embodiment of the present invention, a method for providing repeater communication in a wireless repeater deployed in an environment including other wireless repeaters and other wireless communication devices includes providing a message signal, inserting the message signal into a transmit signal of the repeater where the signal has a power level lower than a power level of the transmit signal, and transmitting the transmit signal with the inserted message signal over a transmit antenna of the repeater.

According to another aspect of the present invention, a method for providing repeater communication in a wireless repeater deployed in an environment including other wireless repeaters and other wireless communication devices includes receiving a receive signal at a receive antenna of the repeater, processing the receive signal to detect a message signal, if any, that is present in the receive signal, and when a message signal is detected in the receive signal, initiating interference mitigation strategy to reduce inter-repeater interference. In another embodiment, a wireless communication device operating in an environment including one or more wireless repeaters may receive an input signal and detect the presence of a message signal. The wireless communication device may modify operations of the wireless communication device in response to the message signal.

According to yet another aspect of the present invention, a wireless repeater having a first antenna and a second antenna to receive a receive signal and transmit a transmit signal where the receive signal is a sum of a remote signal to be repeated and a feedback signal resulting from a feedback channel between the first and second antenna of the wireless repeater includes an amplifier configured to amplify at least the remote signal of the receive signal and to generate an amplified signal, and a signal combine circuit configured to combine the amplified signal with a message signal. The repeater is configured to transmit the transmit signal being the amplified signal combined with the message signal over one of the first and second antennas of the repeater.

According to yet another aspect of the present invention, a wireless repeater having a first antenna and a second antenna to receive a receive signal and transmit a transmit signal where the receive signal is a sum of a remote signal to be repeated and a feedback signal resulting from a feedback channel between the first and second antenna of the wireless repeater includes a detect circuit configured to process the receive signal to detect a message signal, if any, that is present in the receive signal. When a message signal is detected in the receive signal, the repeater is configured to initiate interference mitigation strategy to reduce inter-repeater interference.

DETAILED DESCRIPTION

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment). Moreover, in some traditional repeater implementations, the target is to achieve as high a gain as reasonable while maintaining a stable feedback loop (loop gain less than unity). However, increasing the repeater gain renders isolation more difficult due to the increased signal leaking back into the donor antenna. In general, loop stability demands require that the signal leaking back into the donor antenna from the coverage antenna be much lower than the remote signal (the signal to be repeated). The maximum achievable signal to interference/noise ratio (SINR) at the output of the repeater is then the same as the SINR of the remote signal at the input to the repeater. High gain and improved isolation form two demands required for modern day repeaters, especially those for indoor applications.

Systems and techniques herein provide for wireless repeaters with improved isolation between the repeaters' donor antenna ("the receiving antenna" for the example of a forward link transmission) and the coverage antenna ("the transmitting antenna" for forward link transmissions). Furthermore, in some embodiments, systems and techniques herein provide for a unique repeater design employing interference cancellation or echo cancellation to significantly improve the isolation. In some embodiments, the interference cancellation and echo cancellation are realized using improved channel estimation techniques provided herein for accurate estimation of the channel. Effective echo cancellation requires very accurate channel estimation of the leakage channel. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to cancellation of an estimated leakage signal, which provides for partial or complete cancellation of the actual leakage signal.

According to one aspect of the present invention, systems and techniques herein provide for improving repeater performance in a multi-repeater environment. In some embodiments, systems and techniques that facilitate inter-repeater communication are provided. According to another aspect of the present invention, systems and techniques for suppressing interference and reducing delay spread from neighboring repeaters are provided.

Figure 2:
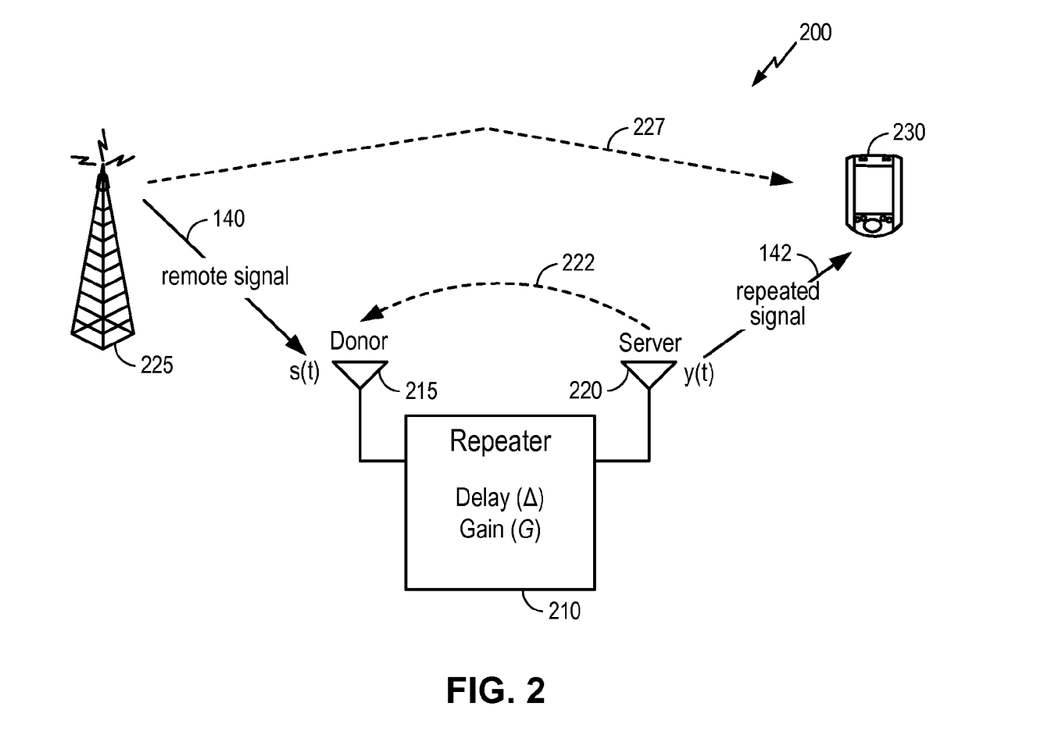
FIG. 2 shows a diagram of a repeater environment according to some embodiments of the current disclosure.

FIG. 2 shows a diagram of an operating environment 200 for a repeater 210 according to embodiments of the current disclosure. The example of FIG. 2 illustrates forward link transmissions; i.e., a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay $\Delta$ is configured to repeat a signal received from base station 225 on a donor antenna 215 to mobile device 230 using a server antenna 220. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where $y(t)=\sqrt{G}s(t-\Delta)$. Ideally, the gain G would be large, the inherent delay $\Delta$ of the repeater would be small, the input SINR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. In other words, signal leakage is a result of the transmitted signal not being totally blocked by antenna isolation between the receiving and transmitting antennas. Without interference cancellation or other techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay $\Delta$. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

In embodiments of the current disclosure, a repeater suitable for indoor coverage (e.g., business, residential, or similar use) is provided. The repeater has an active gain of about 70 dB or greater which is an example of a sufficient gain for coverage in a moderately sized residence. Furthermore, the repeater has a loop gain of less than one for stability (loop gain being referred to as the gain of the feedback loop between the transmitting antenna and the receiving antenna) and a sufficient amount of margin for stability and low output noise floor. In some embodiments, the repeater employs interference/echo cancellation to achieve a high level of active isolation, which is significantly more challenging than the requirements of available repeaters.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Multiple Repeater Environment

A repeater is often installed in an environment where one or more other repeaters are present. Stability and interference of the repeater's operation in the presence of multiple RF repeaters are common concerns. A typical repeater receives a remote signal, amplifies the remote signal and then transmits the amplified remote signal as the output signal. Part of the transmitted signal leaks back into the receiver. If the isolation between the donor and coverage antennas is large enough, the system remains stable. However, if there are other repeaters in the coverage zone, the transmitted signal from the output of one repeater will be received by another and vice versa. Signal leakage in a multiple repeater environment can cause problems in maintaining stability of the individual repeater. Such a scenario can arise in unplanned repeater deployments.

Repeater Communication

According to some embodiments of the present invention, a method and system for implementing repeater communication in a wireless repeater inserts a message signal in the transmit signal of the repeater. The message signal may contain an identifying sequence uniquely identifying the repeater or the message signal may contain information relating to the operational characteristics of the repeater. A repeater may discover the presence of other repeaters in its coverage neighborhood by detecting the presence of the message signal in the receive signal. In this manner, the repeater communication method of the present invention realizes a discovery and communication mechanism across repeaters. Stability and interference issues associated with a multi-repeater environment can then be alleviated. Once neighboring repeaters are detected, mitigation strategies, such as backing off gain to control the signal level at a nearby repeater or requesting the other repeaters to back off their gain, can be used.

Furthermore, the repeater communication method of the present invention enables communication between the repeater and a wireless communication device operating in the coverage neighborhood of the repeater. The wireless communication device may detect the message signal embedded in the transmit signal of the repeater to obtain operational information of the repeater. The wireless communication device may then modify its operation as needed in response to the message signal. Accordingly, a repeater implementing the repeater communication method of the present invention is able to communicate or transmit its operational parameters either to other neighboring repeaters or to wireless communication devices.

A salient feature of the repeater communication method of the present invention is that in-band communication is used to allow one repeater to discover and communicate with neighboring repeaters without causing undue signal degradation. More specifically, the repeater communication method is carried out at the same frequency as the remote signal that is being repeated, thus, the repeater communication is in-band communication.

In one embodiment, the message signal is a low power spreading sequence embedded into the transmit signal of the repeater. In some embodiments, the message signal may contain an identifying sequence being a unique or quasi-unique low power spreading sequence inserted into the transmit signal of a repeater to uniquely identify the repeater. In other embodiments, the message signal may encode information relating to the operational characteristics of the repeater into the low power spreading sequence.

Figure 3:
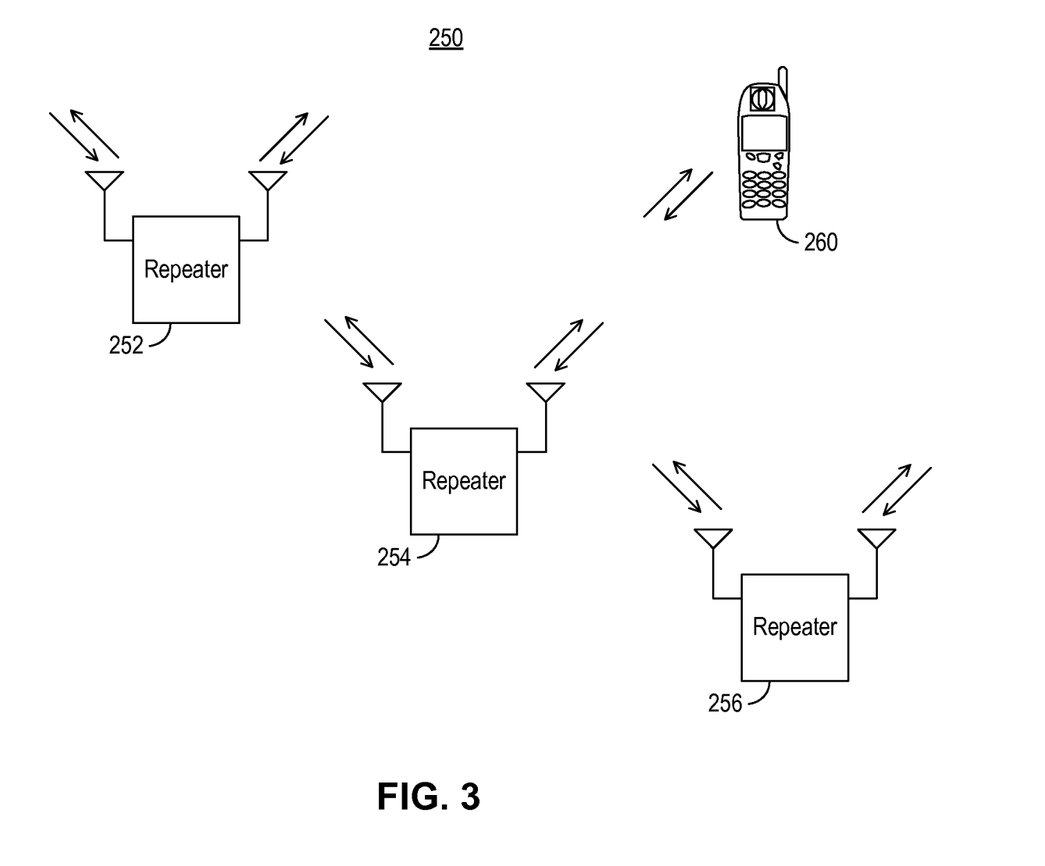
FIG. 3 illustrates a multi-repeater environment in which the repeater communication system and method of the present invention can be employed according to some embodiments of the present invention.

FIG. 3 illustrates a multi-repeater environment in which the repeater communication system and method of the present invention can be employed according to some embodiments of the present invention. Referring to FIG. 3, in a multi-repeater environment 250, two or more repeaters 252, 254 and 256 may be operating with overlapping coverage area. Each of repeaters 252, 254 and 256 transmits downlink communications and receives uplink communications. A wireless communication device 260 may be communicating with a base station through one of the repeaters in environment 250. In the present description, the wireless communication device 260 may be a cellular handset or a mobile telephone, a personal communication system device, a personal information manager, a personal digital assistant, a laptop computer or other mobile or stationary devices which are capable of receiving and transmitting wireless communication.

According to one embodiment of the present invention, each of repeaters 252, 254 and 256 implements the repeater communication method of the present invention to discover the presence of other repeaters in its coverage area. Repeater 252, 254 or 256 may also implement the repeater communication method to communicate to neighboring repeater its operational characteristics such as its gain setting or the power level the repeater receives from nearby repeaters. When inter-repeater communication is enabled, the repeaters may implement one or more mitigation strategies to mitigate interference or other degradation due to the presences of multiple repeaters in the coverage area.

According to another embodiment of the present invention, a wireless communication device in environment 250 may implement the repeater communication method of the present invention to discover operational characteristics of the repeater it is communicating with. In conventional operations, a repeater is transparent to a wireless communication device and the repeater operates merely a signal relay, forwarding uplink and downlink signals between the wireless communication device and the base station. In conventional operations, a wireless communication device does not communicate with the repeater and does not know anything about the operational characteristics of the repeater.

However, in accordance with the present invention, a wireless communication devices, receiving incoming input signals from a repeater, may attempt to detect the message signal that may be embedded in the transmit signals of the repeater. The message signal may contain information relating to the operational characteristics of the repeater to allow the wireless communication device to modify its communication parameters, if necessary. In one embodiment, the message signal contains the power amplifier headroom value of the repeater. Because the wireless communication device typically operates with a different power amplifier headroom than the repeater, the wireless communication device may transmit output signals at a power level greater than which can be handled by the repeater. According to the present invention, the wireless communication device, upon detecting and processing the message signal from a repeater, may operate to set the power level of it's output signal to stay within the power amplifier headroom value of the repeater. Alternatively, the communication device may set its power headroom to be the minimum of the power headroom of the repeater and its own available headroom.

Figure 4:
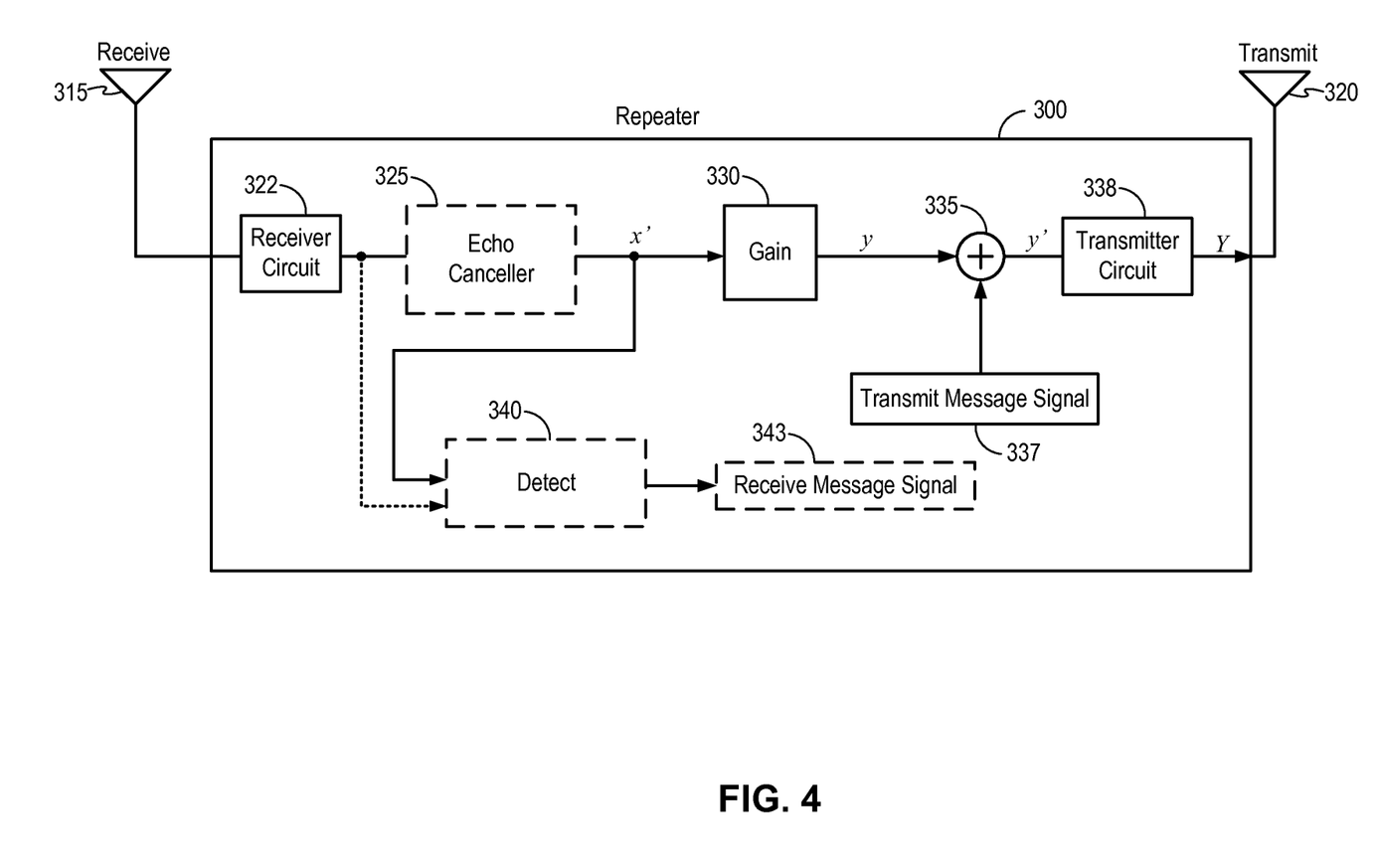
FIG. 4 is a block diagram of a repeater implementing the repeater communication method according to one embodiment of the present invention.

FIG. 4 is a block diagram of a repeater implementing the repeater communication method according to one embodiment of the present invention. Referring to FIG. 4, a repeater 300 receives a receive signal "x" on a receive antenna 315 through a receive circuit 322. The receive signal includes the remote signal to be repeated and may also include a feedback signal resulting from a feedback channel between the receive antenna 315 and the transmit antenna 320 of the repeater. In repeater 300, at least the remote signal component of the receive signal is amplified by an amplifier 330 having a gain of G. Amplifier 330 generates an amplified signal "y" to be transmitted out of the repeater. Repeater 300 may be implemented with or without echo cancellation. When repeater 300 is an echo cancellation repeater, an echo canceller 325 (in dotted line) is provided before the amplifier 330 to cancel out the undesired feedback signal from the receive signal. Repeater 300 may contain other control circuitry, such as a channel estimation block (not shown) for estimating the feedback channel and a gain control block (not shown) for controlling the gain of amplifier 330. These and other control circuitry of repeater 300 are not shown in FIG. 3 to simplify the discussion but it is understood that repeater 300 may include other elements to realize full repeater operation.

In repeater 300, before the amplified signal is transmitted out on a transmit antenna 320, a message signal 337 is added to the amplified signally to enable repeater communication. The combined amplified and transmit message signal y' is provided to a transmit circuit 338 to be transmitted from antenna 320. Transmit circuit 338 may include filters and driver circuitry. In one embodiment, the message signal is a low power spreading sequence and has a power level much less than the power level of the amplified signal y. The low power message signal transmitted by a repeater is referred herein as the "transmit message signal." In the present illustration, an adder 335 represents the addition of the message signal 337 to the amplified signally. Adder 335 is symbolic only and in actual implementation, appropriate circuitry for combining the low power message signal with the amplified signal may be used.

As thus configured, a transmit signal "Y" is generated and is the combination of the amplified signally and the low power transmit message signal 337 and the transmit signal is transmitted over the transmit antenna 320. In one embodiment, the inserted message signal is of sufficiently low power so that the noise floor introduced is negligible. In one embodiment, the inserted message signal is 30-40 dB lower than the amplified signal. When the inserted message signal is of sufficiently low power, the inserted message signal would be transparent to end-user devices communicating with the repeater and would merely be seen as noise.

In the present embodiment, repeater 300 also includes a detect circuit 340 for receiving either the echo-cancelled receive signal x' or the receive signal x as an input signal and processing the input signal to detect and identify any low power message signal that may be present in the receive signal. The detected message signal 343, also referred to as the "receive message signal," may then be used by the repeater to initiate appropriate or desired mitigation strategies. In one embodiment, when the message signal is a low power spreading sequence, techniques familiar to those versed in the art may be used to ensure proper detection of the low power spreading sequence embedded in the receive signal. Detect circuit 340 is required only when repeater 300 is deployed in a multi-repeater environment with other similarly constructed repeaters for facilitating inter-repeater communication. In some cases, it is only necessary for repeater 300 to transmit a message signal and it is not necessary for repeater 300 to detect the message signal from other repeaters. In that case, detect circuit 340 is optional and may be omitted.

The message signal may encode repeater identification or repeater operational characteristics or other useful information for use by the repeaters in a multi-repeater environment. In one embodiment, the message signal is a unique or quasi-unique low power spreading sequence for uniquely identifying the repeater. In other embodiments, the message signal encodes information relating to the operational characteristics of the repeater. For example, the message signal may encode the gain level of the repeater, or the power level the repeater receives from nearby repeaters. The message signal may also encode the power amplifier headroom value of the repeater. Providing the power amplifier headroom information in the message signal provides advantages for communicating with an end-user wireless communication device to enable the end-user wireless communication device to transmit signals to the repeater using the appropriate power level.

Figure 5:
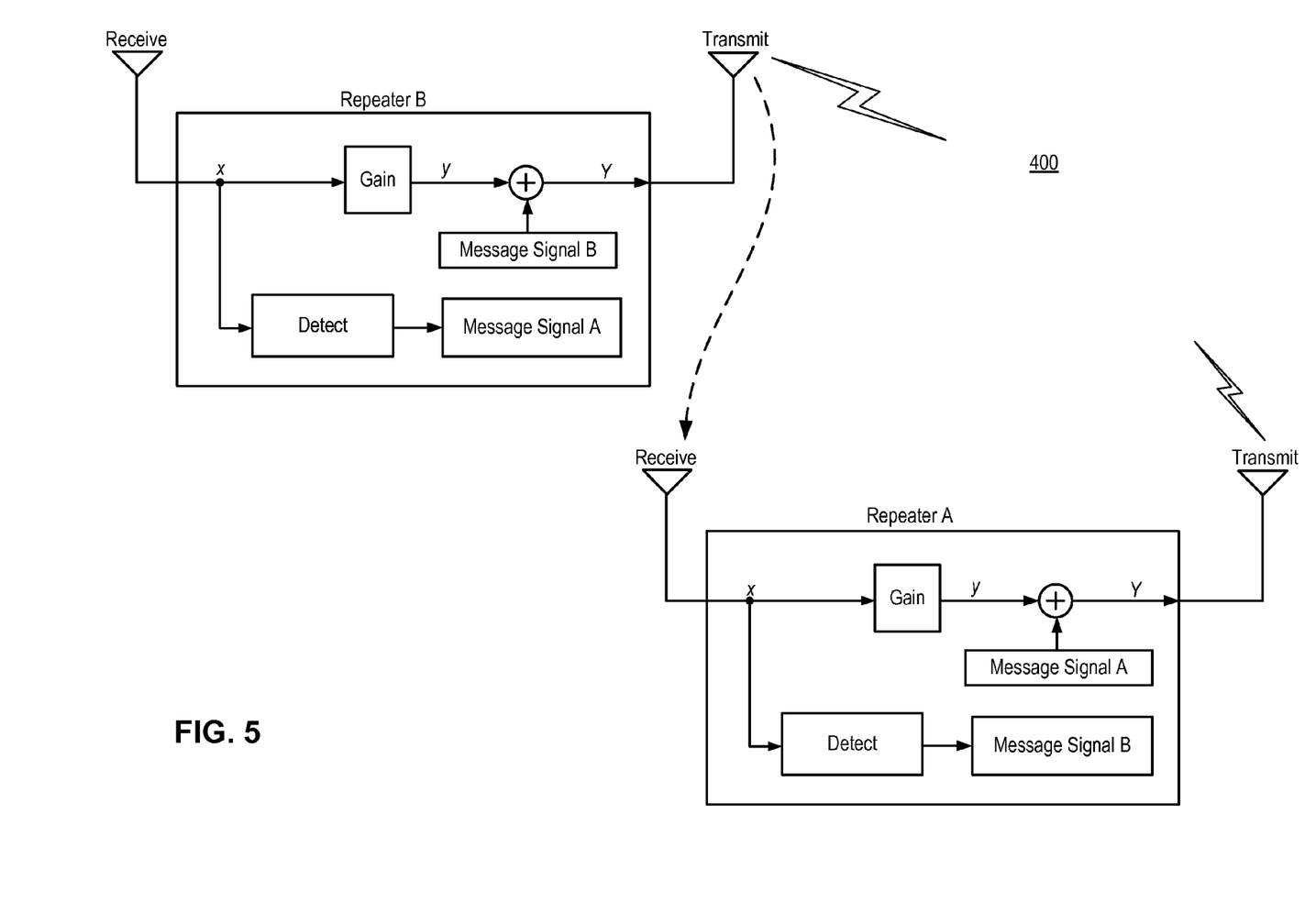
FIG. 5 illustrates a multi-repeater environment including repeaters implementing the repeater communication method according to one embodiment of the present invention.

FIG. 5 illustrates a multi-repeater environment including repeaters implementing the repeater communication method according to one embodiment of the present invention. The inclusion of the low power message signal in the transmit signal allows the discovery of repeaters in a multi-repeater environment. More specifically, when each repeater in a multi-repeater environment is given a unique or quasi-unique low power message signal to identify the repeater, the low power message signals are then used as a messaging protocol among the multiple repeaters. Referring to FIG. 4, a multi-repeater environment 400 including a first repeater (Repeater A) and a second repeater (Repeater B) is shown. Repeaters A and B are constructed in the same manner as the repeater in FIG. 3 and each repeater operates to insert a lower power message signal being an identifying sequence in the transmit signal of each repeater. Furthermore, each repeater inserts a unique or quasi-unique identifying sequence so that repeater A is provided with a message signal/identifying sequence A and repeater B is provided with a message signal/identifying sequence B, uniquely identifying the individual repeaters. Repeaters A and B can thus use their unique identifying sequences to advertise their presence as well as other low bandwidth information to repeaters in its coverage area.

In the present illustration, repeaters A and B are not echo cancelling repeaters. One or more of repeaters A and B may be an echo cancellation repeater. Furthermore, in the present illustration, repeaters A and B are each provided with a detect circuit for receiving the receive signal and processing the receive signal to detect and identify the low power message signal that may be present in the receive signal.

Figure 6:
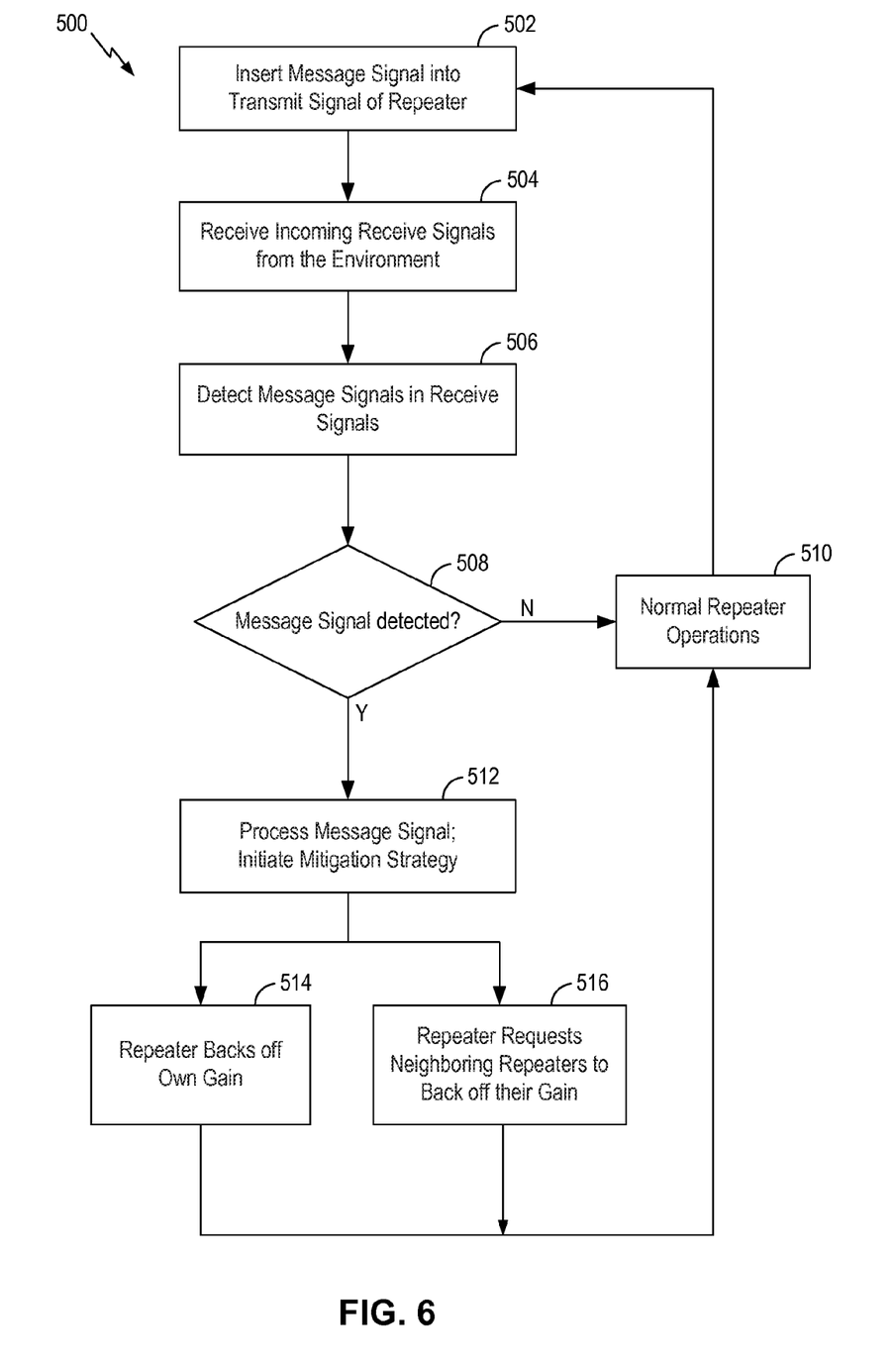
FIG. 6 is a flowchart illustrating the repeater communication method implemented in a repeater according to one embodiment of the present invention.

FIG. 6 is a flowchart illustrating the repeater communication method implemented in a repeater according to one embodiment of the present invention. Referring to FIG. 6, repeater communication method 500 starts by inserting a message signal into the transmit signal of a repeater, such as Repeaters A and B in FIG. 5, (step 502). The low power message signal is then used by the repeaters in a multi-repeater environment to detect the presence of other repeaters in its coverage area. A repeater, incorporating a detect circuit, receives incoming receive signals from its coverage neighborhood (step 504). For instance, Repeater A receives the transmit signal from Repeater B, including the identifying sequence B, from the transmit antenna of Repeater B. Repeater A, upon receiving the receive signal, operates to detect if any message signal is present in the receive signal (step 506). If no message signal is detected (step 508), Repeater A continues with normal repeater operation (step 510) and method 500 repeats. If a message signal, such as identifying sequence B associated with Repeater B, is detected, Repeater A processes the message signal and initiates one or more mitigation strategies to reduce inter-repeater interference (step 512). In accordance with embodiments of the present invention, various mitigation strategies may be employed. In one embodiment, the mitigation strategies may involve merely discovering or recognizing the presence of other repeaters within its coverage area and no further action is taken. In another embodiment, Repeater A may back off or reduce its own gain in response to receiving the message signal (step 514). In an alternate embodiment, Repeater A may request the neighboring repeaters, such as Repeater B, to back off or reduce their gain (step 516). Other interference mitigation strategies may also be used. FIG. 6 is illustrative only and is not intended to be limiting. For instance, in another embodiment, when Repeater A is provided with an antenna array, Repeater A may use antenna array signal processing (interference nulling) to steer the antenna array to null the channel from Repeater B.

Figure 7:
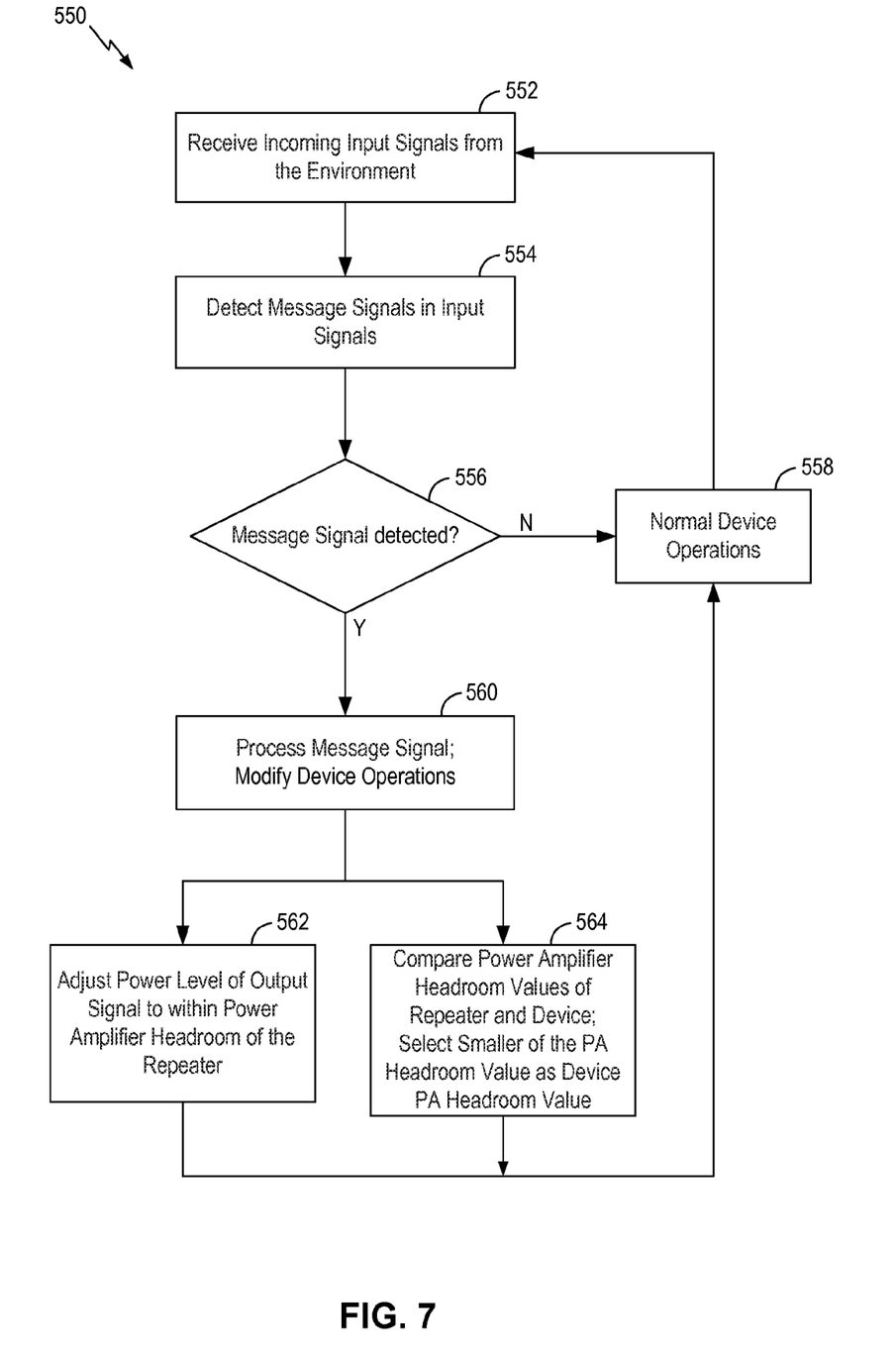
FIG. 7 is a flowchart illustrating the repeater communication method implemented in a wireless communication device according to one embodiment of the present invention.

FIG. 7 is a flowchart illustrating the repeater communication method implemented in a wireless communication device according to one embodiment of the present invention. When a repeater implements the repeater communication method of the present invention and transmits a transmit signal embedded with the message signal, a wireless communication device, communicating with the repeater, may detect the message signal and use the message signal to obtain information concerning the repeater. Referring to FIG. 7, repeater communication method 550 starts by receiving incoming input signals from the environment (step 552). For instance, repeater 252 may transmit downlink signals to wireless communication device 260 (FIG. 3). The wireless communication device, upon receiving the input signal, operates to detect if any message signal is present in the input signal (step 554). If no message signal is detected (step 556), the wireless communication device continues with normal device operation (step 558) and method 550 repeats. If a message signal is detected, the wireless communication device processes the message signal to decode its content (step 560). The wireless communication device may then modify its operations in response to the message signal. In one embodiment, the wireless communication device may merely acknowledge the presence of the repeater and takes no further action.

In another embodiment, the message signal contains the power amplifier (PA) headroom value of the repeater. In response to the detected message signal, the wireless communication device may modify its operation by adjusting the power level of its own output signal to be within the power amplifier headroom value of the repeater, as communicated by the message signal (step 562). In an alternate embodiment, the wireless communication device may compare the PA headroom information of the repeater contained in the message signal with its own power amplifier headroom value. The wireless communication device may then select the smaller of the two PA headroom values to use as its own PA headroom value (step 564). Thus, assuming the PA headroom value of the wireless communication device is H1 and the PA headroom value of the repeater, as communicated by the message signal, is H2, the wireless communication device compares H2 with H1 and selects the smaller value as its own PA headroom value. Therefore, when H2 is less than H1, the wireless communication device selects H2, the PA headroom value of the repeater, as its own PA headroom value.

The repeater communication method of the present invention using a low power message signal for providing repeater identification and repeater information realizes many advantages. First, the low power message signal creates a messaging mechanism between repeaters, allowing them to exchange relevant information that would be useful to maintain stability in presence of multiple repeaters. For example, a repeater can advertise that it may be seeing too much signal power from a nearby repeater and request the nearby repeater to lower its power. Second, when a repeater is provided with multiple receive antennas (an antenna array), the low power message signal may also be used to learn the channel from neighboring repeaters (either the actual channel or statistics) and then use multi-antenna signal processing to reduce the impact of the signal from that repeater. Lastly, the transmitted low power spreading sequence may be used for robust boot-up strategies, such as to measure isolation and delay.

Neighboring Repeater Suppression

In a wireless communication system, an RF modulated signal from a transmitter may reach a receiver via a number of propagation paths, the multiple propagation paths being a result of the transmitted signal being reflected off of or be attenuated by various obstacles and surrounding objects in the environment. As a result, various copies of the transmitted signal, at various power levels, are received at the receiver with various time delays introduced. Delay spread or multipath effect refers to the same signals being reflected off different paths and arriving at the antenna of a receiver at different times. The multiple copies of the transmitted signals received at the receiver are often referred to as multipath signals or multipath components. Delay spread is a measure of the time delay between the arrival of the first significant multipath component and the arrival of the last significant multipath component.

Neighboring repeaters and remote signal delay spread can cause significant degradation to repeater performance and may even cause repeater instability. According to one aspect of the present invention, systems and techniques herein provide for a wireless repeater employing an antenna array whereby the array weights or array weight coefficients for the antenna array are selected to suppress multipath signals and reduce delay spread resulting from neighboring repeater. In one embodiment, the receive antenna of a wireless repeater is configured using beam steering methods to suppress the signal from neighboring repeaters. In another embodiment the receive antenna may be configured using beam steering methods to reduce the delay spread in the signal from the basestation. In this manner, signals from neighboring repeaters can be nulled out or the antenna array can be steered to a more directional beam to reduce the delay spread.

Figure 8:
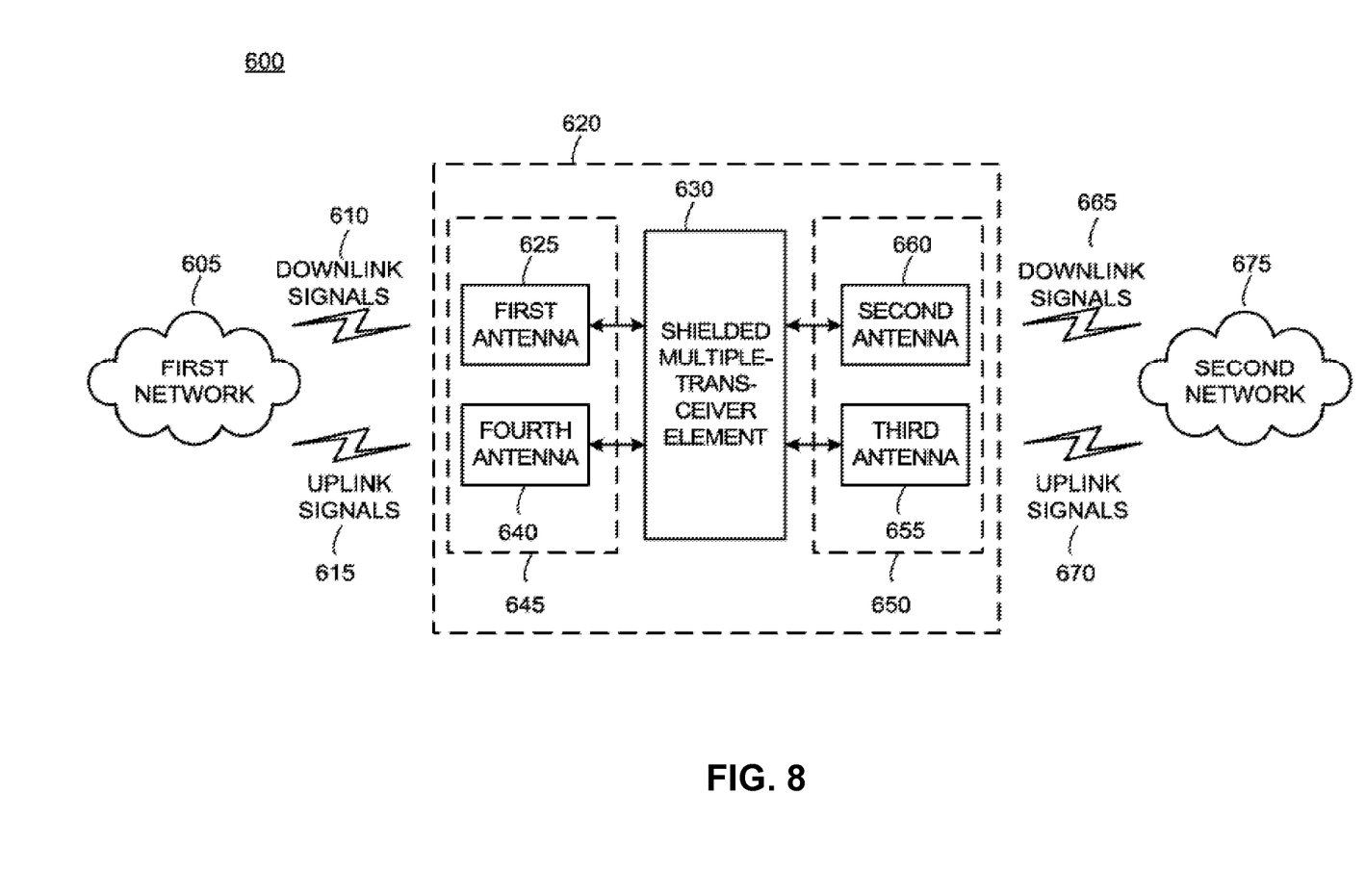
FIG. 8 illustrates a repeater environment in which a repeater with an antenna array is deployed according to embodiments of the present invention.

FIG. 8 illustrates a repeater environment in which a repeater with an antenna array is deployed according to embodiments of the present invention. A repeater 620 in repeater environment 600 includes an antenna array 645 having a first antenna element 625 and a fourth antenna element 640, a multiple transceiver element 630, and an antenna array 650 comprising a second antenna element 660 and a third antenna element 655. Multiple transceiver element 630 includes receiver circuits and transmitter circuits associated with each of the antenna elements. Operatively, downlink signals 610 originating from first network 605 can be processed by repeater 620 to generate repeated downlink signals 665 for communication to second network 675, and uplink signals 670 originating from second network 675 can be processed by repeater 620 to generate repeated uplink signals 615 for communication to first network 605.

In other embodiments, repeater 620 can include additional antenna elements and associated receiver circuits. Further, it is appreciated that the number and configuration of the antenna arrays described herein are merely illustrative as the repeater system and method of the present invention contemplate use of varying number of antenna arrays having varying configurations and comprising varying number of antenna elements.

According to one aspect of the present invention, a repeater employs an antenna array and implements an antenna weight determination method of the present invention to suppress multipath signals, thereby improving signal reception. More specifically, the repeater applies the antenna weight determination method of the present invention to modify the spatial selectivity of the antenna array so as to steer the antenna array of the repeater to be more sensitive to the first arrival of a signal and to minimize reception of the multipath components of the same signal. In this manner, the antenna array is configured so as to maximize reception from a dominant path while suppressing reception of signals from neighboring repeaters or from remote signal delay spread which are considered multipath signals.

In an antenna array, the signal from each antenna element can be scaled by a different weight and a specific weighting pattern can be used to achieve the desired antenna sensitivity. In the present description, array weights refer to the weights or factors that multiply the received signal of each antenna element. When the array weights are chosen properly, the antenna array can be steered in such a way so as to cancel energy from undesirable directions and make more sensitive energy from desired directions. That is, the antenna array can be steered by changing the antenna weights to change the direction of maximum reception.

In one embodiment, the antenna weight determination method steers the receive antenna beam to minimize a metric (Metric 1): $(a*X+b*Y+c*Z)/S$, where X is the power in the repeater feedback signal; Y is the power in the signals from neighboring repeaters; Z is the power in the undesired remote signal delay spread; and S is the power in the desired, usable signal. The antenna weights are selected using beam steering methods known to those versed in the art to minimize Metric 1. Coefficients a, b and c are selected to reflect the relative importance of the signals that are to be mitigated. In one embodiment, a=1, b=0, c=0 and the antenna weights would be determined to mitigate the repeater feedback signal while ignoring the signals from the neighboring repeaters and the undesired, remote signal delay spread. In another embodiment, a=0, b=1, c=0 and the antenna weights would be determined to mitigate the signal from the neighboring repeaters while ignoring the repeater feedback signal and undesired remote signal delay spread.

Figure 9:
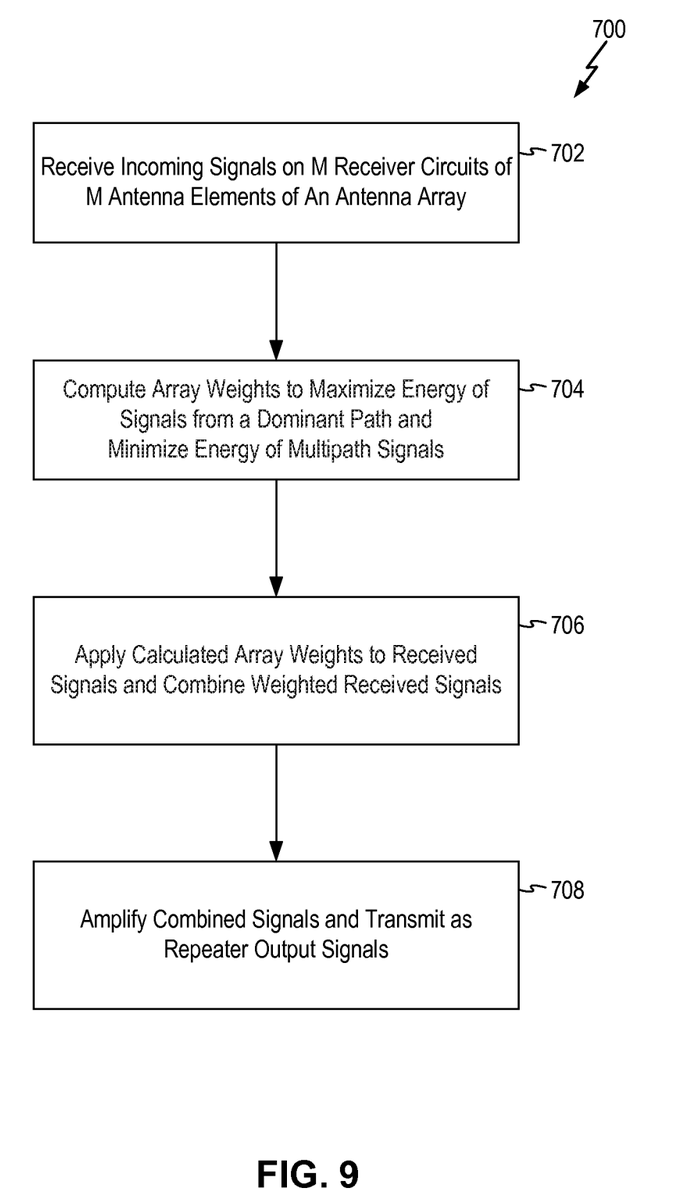
FIG. 9 is a flow chart illustrating the antenna weight determination method implemented in a repeater employing an antenna array for suppressing multipath signals according to one embodiment of the present invention.

FIG. 9 is a flow chart illustrating the antenna weight determination method implemented in a repeater employing an antenna array for suppressing multipath signals according to one embodiment of the present invention. Referring to FIG. 9, antenna weight determination method 700 is implemented in a repeater employing an antenna array including M antenna elements. Each of the M antenna elements is coupled to a transceiver circuit of the repeater to process incoming and outgoing signals. More specifically, each transceiver circuit includes a receiver circuit to receive the incoming received signal from the associated antenna element and a transmitter circuit to provide the outgoing transmitted signal to the associated antenna element. At step 702, the repeater receives incoming signals from the operating environment on M receiver circuits associated with M antenna elements of the antenna array. The incoming signals can include remote signals from nearby base stations, the feedback signal from the repeater's own antennas, and also multipath signals.

Method 700 then computes the antenna array weights associated with each of the M antenna elements (the "array weights") in order to maximize the energy of signals from a dominant path while minimizing the total energy from the multipath signals (step 704). The array weights determination can be carried out using various metrics. In one embodiment, the array weights are adapted by minimizing Metric 1 above. In this manner, the array weights are selected so as to enhance the reception of signals from a dominant path while suppressing reception of multipath signals from neighboring repeaters or from remote signal delay spread.

When the array weights are calculated, the calculated array weights are applied to the received signals and the weighted signals from each antenna elements are combined (step 706). The combined signal can then be processed by the repeater. In one embodiment, the combined signals are amplified and transmitted as the repeater output signals on the repeater's antenna array (step 708).

In one embodiment, an antenna weight determination module is incorporated in repeater 620 (FIG. 8) to implement the method of the present invention. The repeater 620 may further incorporate an antenna weight application module configured to apply the calculated antenna weight to condition the received signals.

It is instructive to note that in some repeaters, the antenna weights are determined after echo cancellation is carried out, while in other repeaters, the antenna weights are determined before echo cancellation or without echo cancellation. The antenna weight determination method of the present invention can be implemented in a repeater without echo cancellation, or the method can be implemented in an echo cancellation repeater before or after echo cancellation is applied. Thus, in some embodiments, the repeater may perform echo cancellation after receiving the incoming signals (step 702) but before computing the array weights. Alternately, in other embodiments, the repeater may perform the steps of method 700 and then perform echo cancellation on the combined signals.

In one embodiment, a method to suppress multipath signals in a repeater for a wireless communication network where the repeater employs an antenna array including M antenna elements includes receiving incoming signals on M receiver circuits associated with the M antenna elements, and calculating antenna weights for the M antenna elements using a metric to maximize the energy of signals from a dominant path while minimizing a total energy from the multipath signals.

In another embodiment, a repeater for a wireless communication network where the repeater employs an antenna array including M antenna elements includes M receiver circuits coupled to receive incoming signals associated with the M antenna elements, an antenna weight determination module configured to perform calculations of antenna weights for the M antenna elements where the antenna weight determination module is operative to maximize the energy of signals from a dominant path while minimizing a total energy from the multipath signals using a metric, and an antenna weight application module configured to apply the calculated antenna weight to condition the received signals.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on a computer-readable medium. Computer-readable media includes both computer storage media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method for providing repeater communication in a wireless repeater deployed in an environment including other wireless repeaters and other wireless communication devices, the method comprising:
    providing a message signal;
    inserting the message signal into a transmit signal of the repeater, the signal having a power level lower than a power level of the transmit signal; and
    transmitting the transmit signal with the inserted message signal over a transmit antenna of the repeater, and wherein the message signal comprises at least one type of information selected from the group consisting of: information indicative of one or more operational characteristics of the repeater, information indicative of a repeater gain of the repeater, information indicative of one or more power levels associated with signals from one or more nearby repeaters, and information indicative of a power amplifier headroom value of the repeater.

2. The method of claim 1, wherein the message signal comprises a unique or quasi-unique low power spreading sequence uniquely identifying the repeater from other repeaters in the environment.

3. The method of claim 1, wherein the message signal comprises the information relating to the one or more operational characteristics of the repeater.

4. The method of claim 3, wherein the message signal comprises the information relating to the repeater gain of the repeater.

5. The method of claim 3, wherein the message signal comprises the information relating to the one or more power levels associated with the signals the repeater receives from the one or more nearby repeaters.

6. The method of claim 3, wherein the message signal comprises information relating to the power amplifier headroom value of the repeater.

7. The method of claim 1, further comprising:
    receiving a receive signal at a receive antenna of the repeater; and
    processing the receive signal to detect a message signal, if any, that is present in the receive signal.

8. The method of claim 7, further comprising:
    when a message signal is detected in the receive signal, initiating interference mitigation strategy to reduce inter-repeater interference.

9. The method of claim 8, wherein initiating interference mitigation strategy comprises reducing a gain value of the repeater.

10. The method of claim 8, wherein initiating interference mitigation strategy comprises requesting the other repeaters in the environment to reduce their gain values.

11. The method of claim 1, wherein the message signal is provided with a power level at least 30 dB lower than a power level of the transmit signal.

12. A method for providing repeater communication in a wireless repeater deployed in an environment including other wireless repeaters and other wireless communication devices, the method comprising:
    receiving a receive signal at a receive antenna of the repeater;
    processing the receive signal to detect a message signal, if any, that is present in the receive signal; and
    when a message signal is detected in the receive signal, initiating interference mitigation strategy to reduce inter-repeater interference, and wherein initiating interference mitigation strategy comprises requesting one or more of the other repeaters in the environment to reduce their gain values.

13. The method of claim 12, wherein initiating interference mitigation strategy further comprises discovering the presence of the other repeaters in the environment.

14. The method of claim 12, wherein initiating interference mitigation strategy further comprises reducing a gain value of the repeater.

15. A method for providing repeater communication in a wireless communication device operating in an environment including one or more wireless repeaters, the method comprising:
receiving an input signal from a wireless repeater at an antenna of the wireless communication device;
processing the input signal to detect a message signal, if any, that is present in the input signal from the repeater; and
when a message signal is detected in the input signal that comprises at least one type of information selected from the group consisting of: information indicative of one or more operational characteristics of the repeater, information indicative of a repeater gain of the repeater, information indicative of one or more power levels associated with signals from one or more nearby repeaters other than the repeater, and information indicative of a power amplifier headroom value of the repeater, processing the message signal to modify operations of the wireless communication device in response to the message signal.

16. The method of claim 15, wherein the message signal comprises information relating to the power amplifier headroom value of the repeater, and wherein processing the message signal to modify operations of the wireless communication device in response to the message signal comprises adjusting a power level of an output signal transmitted from the wireless communication device to the repeater to be within the power amplifier headroom value of the repeater.

17. The method of claim 15, wherein the message signal comprises information relating to the power amplifier headroom value of the repeater, and wherein processing the message signal to modify operations of the wireless communication device in response to the message signal comprises:
comparing the power amplifier headroom value of the repeater with a current power amplifier headroom value of the wireless communication device; and
selecting the smaller of the two power amplifier headroom values to use as the power amplifier headroom value of the wireless communication device.

18. A wireless repeater, comprising:
a first antenna and a second antenna configured to receive a receive signal and transmit a transmit signal, the receive signal being a sum of a remote signal to be repeated and a feedback signal resulting from a feedback channel between the first and second antenna of the wireless repeater;
an amplifier configured to amplify at least the remote signal of the receive signal and to generate an amplified signal;
a signal combine circuit configured to combine the amplified signal with a message signal; and
a transmit circuit configured to transmit the combined amplified and message signal as the transmit signal over one of the first and second antennas of the repeater, and wherein the message signal comprises at least one type of information selected from the group consisting of: information indicative of one or more operational characteristics of the repeater, information indicative of a repeater gain of the repeater, information indicative of one or more power levels associated with signals from one or more nearby repeaters, and information indicative of a power amplifier headroom value of the repeater.

19. The wireless repeater of claim 18, wherein the message signal comprises a unique or quasi-unique low power spreading sequence uniquely identifying the repeater from other repeaters in a multi-repeater environment.

20. The wireless repeater of claim 18, wherein the message signal comprises the information relating to the operational characteristics of the repeater.

21. The wireless repeater of claim 20, wherein the message signal comprises information relating to the repeater gain of the repeater.

22. The wireless repeater of claim 20, wherein the message signal comprises information relating to the one or more power levels associated with the signals the repeater receives from the one or more nearby repeaters.

23. The wireless repeater of claim 20, wherein the message signal comprises information relating to the power amplifier headroom value of the repeater.

24. The wireless repeater of claim 18, further comprising:
a detect circuit configured to process the receive signal to detect a message signal, if any, that is present in the receive signal.

25. The wireless repeater of claim 24, wherein when a message signal is detected in the receive signal, the repeater is configured to initiate interference mitigation strategy to reduce inter-repeater interference.

26. The wireless repeater of claim 25, wherein the repeater is configured to reduce its gain as part of the interference mitigation strategy.

27. The wireless repeater of claim 25, wherein the repeater is configured to request the other repeaters in the environment to reduce their gain values as part of the interference mitigation strategy.

28. The wireless repeater of claim 18, wherein the message signal has a power level at least 30 dB lower than a power level of the transmit signal.

29. The wireless repeater of claim 18, further comprising:
an echo canceller configured to cancel a feedback signal estimate from the receive signal.

30. A wireless repeater, comprising:
first and second means for receiving a receive signal and transmitting a transmit signal, the receive signal being a sum of a remote signal to be repeated and a feedback signal resulting from a feedback channel between the first and second means;
means for amplifying at least the remote signal of the receive signal and generating an amplified signal;
means for combining the amplified signal with a message signal; and
means for transmitting the combined amplified and message signal as the transmit signal over one of the first and second means, and wherein the message signal comprises at least one type of information selected from the group consisting of: information indicative of one or more operational characteristics of the repeater, information indicative of a repeater gain of the repeater, information indicative of one or more power levels associated with signals from one or more nearby repeaters, and information indicative of a power amplifier headroom value of the repeater.

31. A wireless repeater, comprising:
a first antenna and a second antenna configured to receive a receive signal and transmit a transmit signal, the receive signal being a sum of a remote signal to be repeated and a feedback signal resulting from a feedback channel between the first and second antenna of the wireless repeater;

a detect circuit configured to process the receive signal to detect a message signal, if any, that is present in the receive signal, when a message signal is detected in the receive signal, the repeater is configured to initiate interference mitigation strategy to reduce inter-repeater interference, and wherein the repeater is configured to initiate the interference mitigation strategy by requesting one or more other repeaters in an environment of the repeater to reduce their gain values.

32. The wireless repeater of claim 31, wherein the repeater is configured to discover the presence of the one or more other repeaters in the environment as part of the interference mitigation strategy.

33. The wireless repeater of claim 32, wherein the repeater is configured to reduce its gain as part of the interference mitigation strategy.

34. A wireless repeater, comprising:

first and second means for receiving a receive signal and transmit a transmit signal, the receive signal being a sum of a remote signal to be repeated and a feedback signal resulting from a feedback channel between the first and second means;

means for processing the receive signal to detect a message signal, if any, that is present in the receive signal, when a message signal is detected in the receive signal, the repeater is configured to initiate interference mitigation strategy to reduce inter-repeater interference, and wherein the repeater is configured to initiate the interference mitigation strategy by requesting one or more other repeaters in an environment of the repeater to reduce their gain values.

35. A wireless communication device operating in an environment including one or more wireless repeaters, the device comprising:

a receiver configured to receive an input signal from a wireless repeater;

a detect circuit configured to process the input signal to detect a message signal, if any, that is present in the input signal, when a message signal is detected in the input signal that comprises at least one type of information selected from the group consisting of: information indicative of a repeater gain of the repeater, information indicative of one or more power levels associated with signals from one or more nearby repeaters other than the repeater, and information indicative of a power amplifier headroom value of the repeater, the wireless communication device is configured to process the message signal to modify operations of the wireless communication device in response to the message signal.

36. The wireless communication device of claim 35, wherein the message signal comprises information relating to the power amplifier headroom value of the repeater in the environment, and wherein the wireless communication device is configured to adjusting a power level of the output signal transmitted from the wireless communication device to the repeater to be within the power amplifier headroom value of the repeater.

37. The wireless communication device of claim 35, wherein the message signal comprises information relating to the power amplifier headroom value of the repeater in the environment, and wherein the wireless communication device is configured to compare the power amplifier headroom value of the repeater with a current power amplifier headroom value of the wireless communication device and select the smaller of the two power amplifier headroom values to use as the power amplifier headroom value of the wireless communication device.

38. A wireless communication device operating in an environment including one or more wireless repeaters, the device comprising:

means for receiving an input signal from a wireless repeater;

means for processing the input signal to detect a message signal, if any, that is present in the input signal, when a message signal is detected in the input signal that comprises at least one type of information selected from the group consisting of: information indicative of a repeater gain of the repeater, information indicative of one or more power levels associated with signals from one or more nearby repeaters other than the repeater, and information indicative of a power amplifier headroom value of the repeater, the wireless communication device is configured to process the message signal to modify operations of the wireless communication device in response to the message signal.

39. A method for providing repeater communication in a wireless repeater deployed in an environment including other wireless repeaters and other wireless communication devices, the method comprising:

receiving a receive signal at a receive antenna of the repeater;

processing the receive signal to detect a message signal, if any, that is present in the receive signal; and when a message signal is detected in the receive signal that comprises at least one type of information selected from the group consisting of: information indicative of one or more operational characteristics of the repeater, information indicative of a repeater gain of the repeater, information indicative of one or more power levels associated with signals from one or more nearby repeaters, and information indicative of a power amplifier headroom value of the repeater, initiating interference mitigation strategy to reduce inter-repeater interference.

* * * * *